(12) United States Patent
Bradley et al.

(10) Patent No.: US 6,609,109 B1
(45) Date of Patent: Aug. 19, 2003

(54) METHOD FOR COMBINING HOUSE PRICE FORECASTS

(75) Inventors: Michael G. Bradley, Potomac, MD (US); James Douglas Gordon, Arlington, VA (US); Douglas A. McManus, Bethesda, MD (US)

(73) Assignee: Freddie Mac, McLean, VA (US)

( * ) Notice: Subject to any disclaimer, the term of this patent is extended or adjusted under 35 U.S.C. 154(b) by 778 days.

(21) Appl. No.: 08/730,289

(22) Filed: Oct. 11, 1996

Related U.S. Application Data

(60) Provisional application No. 60/005,439, filed on Oct. 12, 1995.

(51) Int. Cl.[7] ............................................. G06F 17/60
(52) U.S. Cl. ........................................ 705/35; 705/10
(58) Field of Search ..................................... 705/10, 35

(56) References Cited

U.S. PATENT DOCUMENTS

| | | | |
|---|---|---|---|
| 5,361,201 A | | 11/1994 | Jost et al. ........................ 705/35 |
| 5,414,621 A | * | 5/1995 | Hough ........................... 705/10 |
| 5,664,115 A | * | 9/1997 | Fraser ............................ 705/37 |
| 5,926,792 A | * | 7/1999 | Koppes et al. .................. 705/35 |
| 5,963,919 A | * | 10/1999 | Brinkley et al. ................ 705/22 |

FOREIGN PATENT DOCUMENTS

| | | | | |
|---|---|---|---|---|
| JP | 40452198 A | * | 2/1992 | ........... B42D/15/00 |
| JP | 08077281 A | * | 3/1996 | ............ G06G/1/10 |

OTHER PUBLICATIONS

Andrews et al.; Integrating Judgment with a Regression Appraisal, The Real Estate Appraiser and Analyst, Spring 1986.*
Raftery et al.; Model Selection and Accounting for Model Uncertainty in Linear Regression Models, Nov. 1993.*
Lockwood et al.; Determinants of Industrial Property Value, Real Estate Economics, v24, n2, p257(16), Summer 1996.*
Evaluation and Combination of Forecasts, Chapter 8.
Econometrics, G.S. Maddala, pp. 314–317 (1977).
Economic Forecasting: An Introduction 85–107 (1994).
Forecasting Economic Time Series 265–276 (2d ed., 1986).

* cited by examiner

*Primary Examiner*—Frantzy Poinvil
*Assistant Examiner*—Jagdish N Patel
(74) *Attorney, Agent, or Firm*—Finnegan, Henderson, Farabow, Garrett & Dunner, L.L.P.

(57) ABSTRACT

A system computes a plurality of estimates of a real estate entity based on various types and numbers of predictive models. It also selects a limited number of best estimates to be combined. Finally, the system weights each selected estimate according to the calculated precision of that estimate and combines the weighted estimates into a combined weighted estimate.

22 Claims, 6 Drawing Sheets

| 310 Column | 320 Data Element | 330 Type | 340 Length | 350 WRSI Required | 360 HNC Required | 370 Notes/Codes/Format |
|---|---|---|---|---|---|---|
| @1 | Loan Number | Char | 12 | R | R | |
| @13 | Property Type | Char | 4 | R | | SF-Single Family Unit 2f=2 family, 3f=3 family, 4f=4 family, CO=Condo, PU-PUD, MANU= manufactured, COOP-cooperative, MOHO=mobile home TH=town house, OT=other |
| @17 | Address | Char | 33 | | R | |
| @50 | City | Char | 12 | | R | |
| @62 | State | Char | 2 | R | | |
| @64 | Zip | Char | 5 | | R | |
| @69 | County | Char | 4 | R | R | Must be FIPS County Code |
| @73 | Appraisal Value | Num | 11.2 | see notes | | Required if purchase price not available |
| @84 | Purchase Price | Num | 11 | R | | Leave blank if not available |
| @95 | Original Loan Balance | Num | 11.2 | R | | |
| @106 | UPB | Num | 12.2 | R | | Current UPB |
| @118 | Origination Date | Char | 8 | R | | mm/dd/yy |
| @126 | Original LTV | Num | 5.1 | R | | xxx.x |
| @131 | Current LTV | Num | 5.1 | R | | xxx.x, using current UPB and lower of original appraisal or price |
| @136 | Origination Year | Char | 2 | | | |
| @138 | Product Type | Char | 1 | R | | F=fixed A-arm |
| @139 | Loan Purpose | Char | 2 | R | | 1=purch, 2=rate & term refi, 3=co refi, 4-const, 5=home imprv, 99=other |
| @141 | Coupon | Num | 6.3 | | | |
| @147 | Original Coupon | Num | 6.3 | | | |

FIG. 3

Combined Model Estimate Example
Two Model Example (Repeat Sales and HNC)

| | 510 Repeat Sales Model | | | 520 HNC Model | | | 530 | 540 Combined Model | | |
|---|---|---|---|---|---|---|---|---|---|---|
| | Estimate of Value (RSVAL) | Variance (RSVAR) | Standard Deviation (RSSD) | Estimate of Value (HNCVAL) | Variance (HNCVAR) | Standard Deviation (HNCSD) | Weight (k) | Estimate of Value (C) | Variance (CVAR) | Standard Deviation (CSD) |
| Property 1 | $160,799 | $418,358,091 | $20,453 | $147,985 | $184,680,043 | $13,589 | 0.19307 | $150,459 | $170,490,291 | $13,057 |
| Property 2 | $228,102 | $456,685,184 | $21,370 | $202,661 | $489,817,689 | $22,131 | 0.52916 | $216,123 | $330,734,941 | $18,186 |

FIG. 5

| 610 State | 620 Geographic Area | 630 Period | 640 Growth Rate | 650 Precision |
|---|---|---|---|---|
| AK | 001 | Q8501 | 1.01 | .00003 |
| AK | 001 | Q8502 | 1.00 | .00004 |
| AK | 001 | Q8503 | 0.99 | .00005 |
| - | | | | |
| - | | | | |
| - | | | | |
| - | | | | |
| AK | 001 | Q9602 | 1.05 | .00001 |
| AK | 002 | Q8501 | 1.10 | .00004 |

FIG. 6

METHOD FOR COMBINING HOUSE PRICE FORECASTS

This application claims the benefit of provisional application Ser. No. 60/005,439 filed Oct. 12, 1995.

BACKGROUND OF THE INVENTION

The present invention relates generally to estimating the value of a real estate entity, and more particularly, to combining house price forecasts.

Financial institutions and businesses involved with sales of real estate have long tried to asses the value of real estate entities accurately. For example, financial institutions use estimated value of the real estate entity as one of the key factors in approving loan applications for real estate sales. Relying on the soundness of the estimate, financial institutions accept the risk of lending large sums of money and attach the property as security for the transaction. In this sense, the accuracy of estimated value of the real estate entity is critical.

In addition to the accuracy of the estimate, timeliness is a significant factor. For example, closing on a real estate sales contract may depend on the buyer successfully obtaining a loan within a limited time period. Hence, it is important for lenders to be able to estimate the value of the real estate entity quickly.

Traditionally, real estate personnel performed appraisals manually, but this poses many problems. First, manual appraisals are subjective and vary depending on the appraiser. Second, manual appraisals are expensive. Third, manual appraisals may not be timely due to many unpredictable conditions such as appraiser availability, scheduling conflicts, and weather conditions.

Some have tried to automate the real estate valuation process. For example, Jost et al., U.S. Pat. No. 5,361,201, discloses a neural network-based system for automated real estate valuation. It also discusses other efforts and problems with using statistical models to value real estate entities. In its discussion, Jost et al. points out deficiencies of traditional statistical techniques in estimating property values, namely the inability to capture the complexity and the changing trend of the data. It also discusses difficulties involved with selecting a proper sample size for a statistical model to achieve an acceptable stability and reliability of the estimate.

Jost et al., however, did not explore combining predictive;models, including statistical models, to predict values of real estate entities. Some studies on general forecasting techniques show combining the results of individual models may produce a significantly better estimate than each individual estimate, but none examined the problems of the real estate market. Moreover, there have been no studies to automate the valuation of real estate by combining the predictive models.

Therefore, it is desirable to increase the accuracy of real estate value forecasts by combining the results of each constituent models.

It is also desirable to provide a timely and reliable estimate of value that is free of human biases and inconsistency.

SUMMARY OF THE INVENTION

The present invention combines house price forecasts to obviate the limitations and disadvantages of the related art.

In accordance with the purpose of the present invention, gas embodied and broadly described, a method of estimating the value of a real estate entity comprises several steps. A data processor accesses real estate data and a plurality of predictive models. The processor forms a plurality of estimates for the value of the real estate entity based on the predictive models and selects a plurality of best estimates according to a predetermined criteria. The processor also converts the best estimates into weighted estimates and combines the weighted estimates into a final estimate.

According to another aspect of the present invention, a system comprises a database, forming means, selecting means, converting means, and a combining means. The database contains real estate data and a plurality of predictive models. The forming means forms a plurality of estimates for the value of the real estate entity based on the predictive models. The selecting means selects a plurality of best estimates. The converting means converts the best estimates into weighted estimates according to the predetermined criteria and, finally, the combining means combines the weighted estimates into a final estimate.

BRIEF DESCRIPTION OF THE DRAWINGS

The accompanying drawings, which are incorporated in and constitute a part of this specification, illustrate the invention and together with the description, serve to explain the principles of the invention.

In the drawings,

FIG. 3 is a table illustrating the input data format for a real estate entity to be estimated;

FIG. 5 is a table showing a combined model estimate example; and

FIG. 6 is a table illustrating the stored data for the repeat sales model.

DESCRIPTION OF THE PREFERRED EMBODIMENT

Reference will now be made in detail to the present preferred embodiment of the invention, example of which is illustrated in the accompanying drawings.

Figure 1:
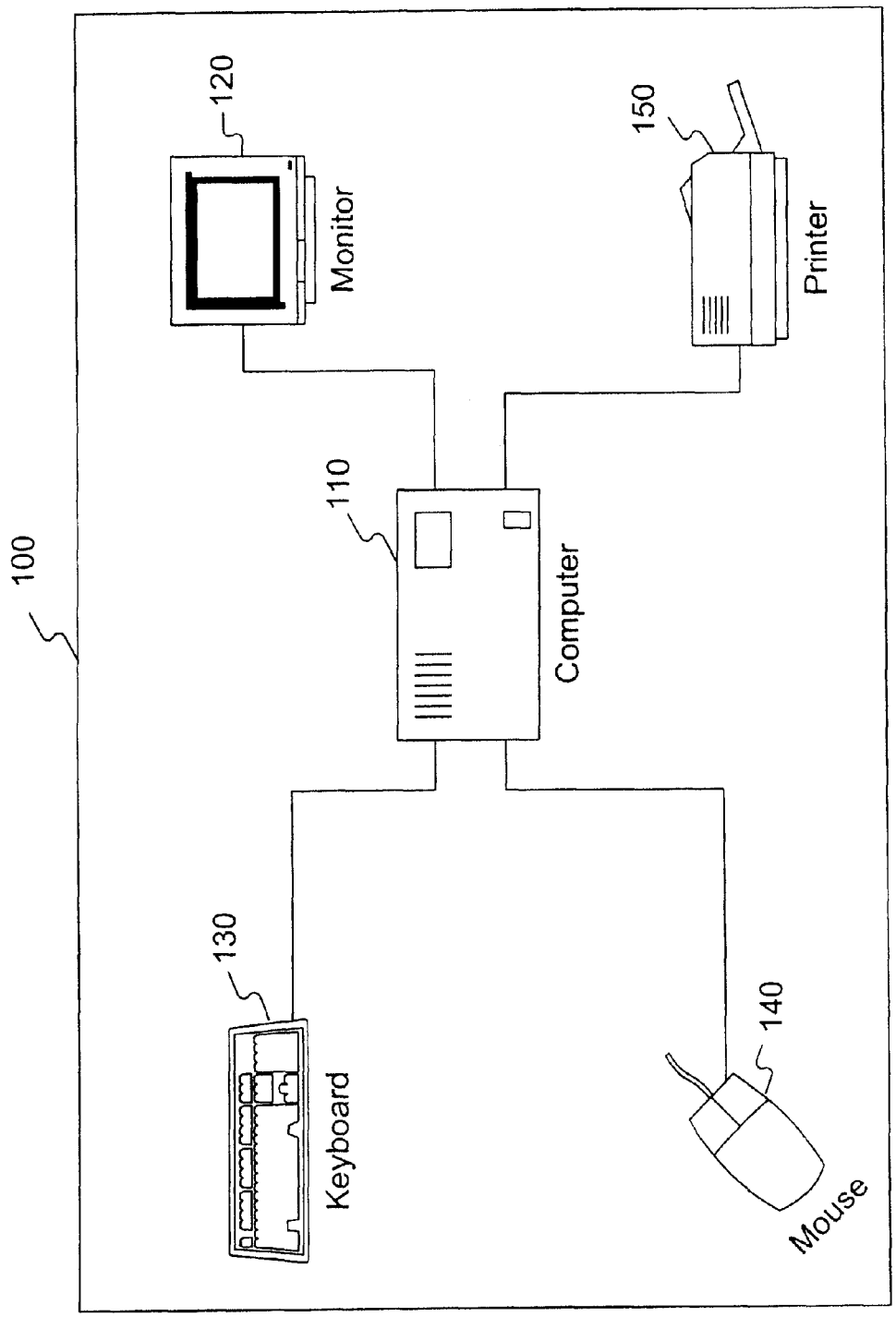
FIG. 1 is a diagram of a system according to a preferred embodiment of the present invention.

FIG. 1 is a diagram of a preferred embodiment of the present invention. As shown in FIG. 1, a computer system 100 includes a computer 110 connected to a monitor 120, a keyboard 130, a mouse 140, and a printer 150. In the preferred embodiment computer 110 is a SUN SPARC 1000.

Figure 2:
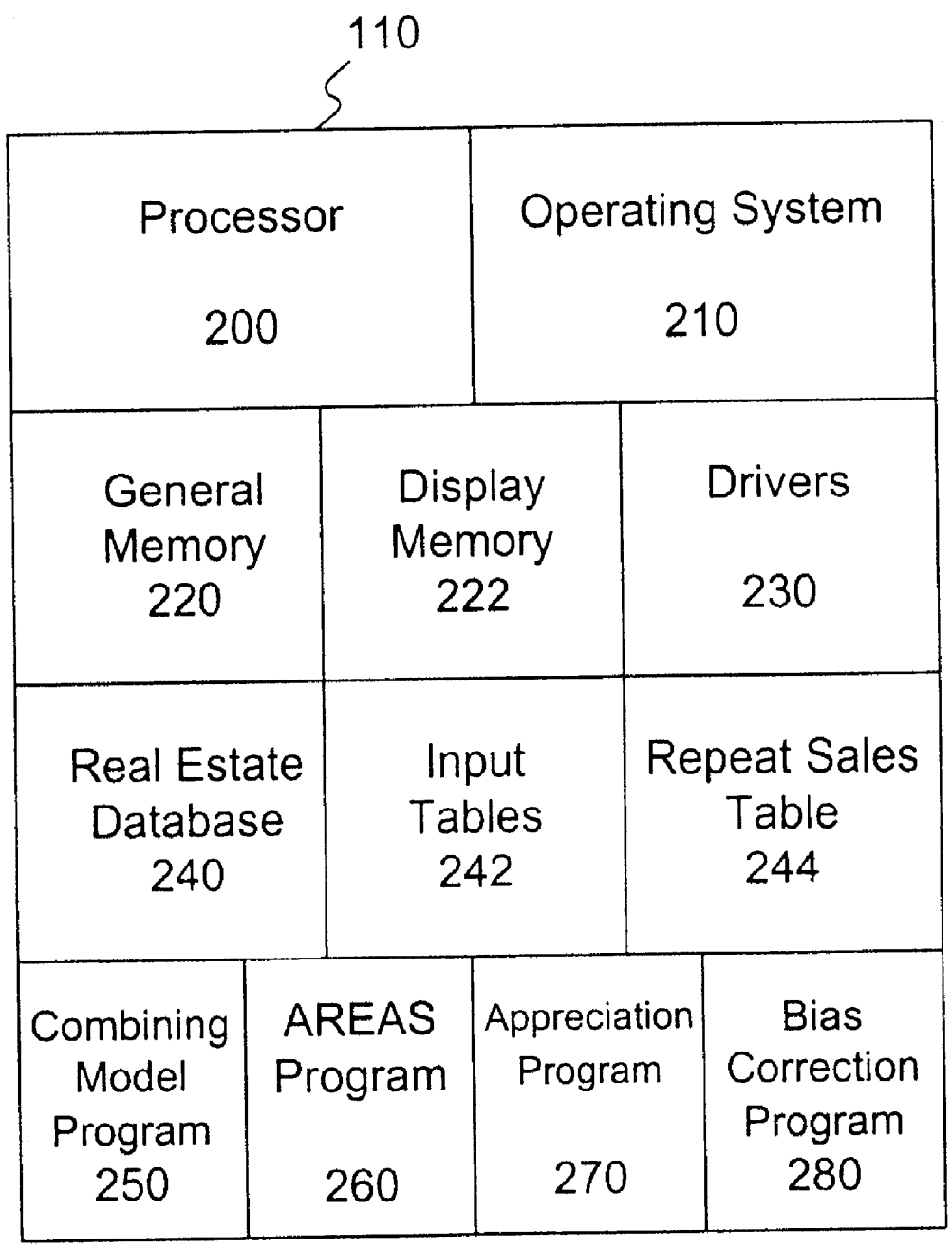
FIG. 2 is a schematic diagram illustrating in detail components of a computer shown in FIG. 1

FIG. 2 shows a schematic diagram illustrating components of computer 110. A processor 200 is preferably a SUN SPARC 1000 operating on an operating system 210, preferably SUN OS 4.06. Computer 110 has RAM composed of a general memory 220 and a display memory 222. Drivers 230 control various input and output devices connected to computer 110. Computer 110 also contains real estate database 240, input tables 242, and repeat sales table 244, all of which will be explained below. Additionally, a combining model program 250 controls the overall process of system 100 and oversees an AREAS (Automated Real Estate Analysis System) program 260, an appreciation program 270, and a bias correction program 280; AREAS program 260, preferably version 4.06, commercially available from HNC, Inc., computes the HNC model.

In the preferred embodiment, computer 110 receives valuation requests and processes the requests. FIG. 3 shows an input table 242 illustrating the format of a sample request. Column 310 indicates the starting position of each field. Column 320 contains data elements about the real estate entity to be valued. As shown in FIG. 3, this data may contain information about loan number, property type, address including city, state, zip, and county, appraisal value, purchase price, original loan balance, origination date of the loan, original loan-to-value, current loan-to-value, loan origination year, loan type, coupon, and original coupon.

The next column, 330, indicates the type of field, i.e., character or number. Column 340 specifies the length of each field. Columns 350 and 360 indicate whether certain fields are required for weighted repeat sales index (WRSI) and HNC model, respectively. Finally, column 370 contains additional notes, codes, or format information about the fields.

Combining model program 250 may combine any number of predictive models. Additionally, individual forecast models A, B, etc., may be one of any type of predictive models such as statistical models (e.g., repeat sales models, hedonic models), a neural network-based model, or manual evaluation of the real estate entities.

For illustration purposes, combining model program 250 will combine a repeat sales model and the HNC model, but one of ordinary skill in the art can easily modify the number and the types of models to be combined. An example of combining models will be explained below referring to FIGS. 4–6.

Figure 4:
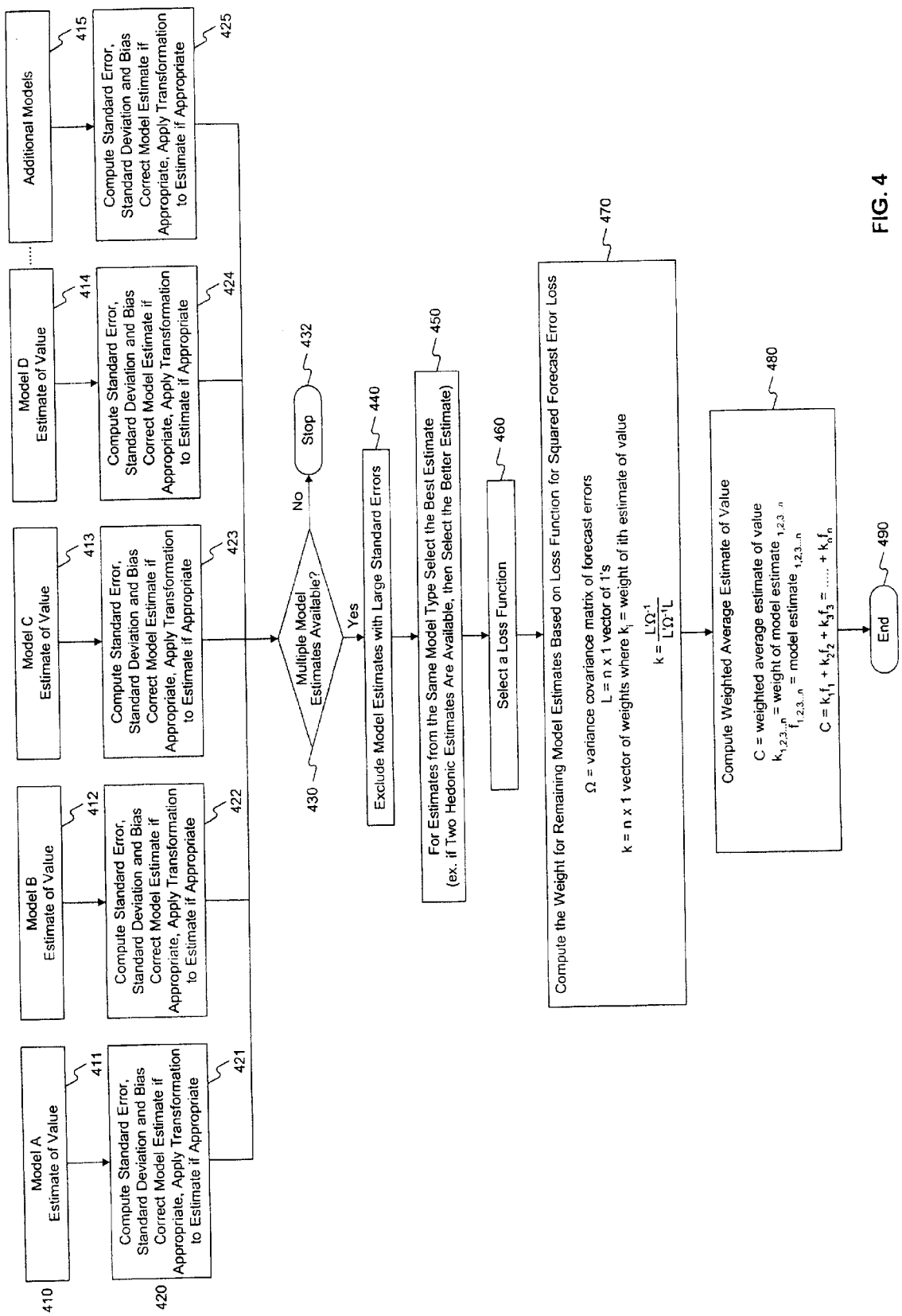
FIG. 4 is a flowchart illustrating the process of the combined model forecasting according to the preferred embodiment of the present invention.

FIG. 4 shows a flowchart illustrating the process of the combined model forecasting according to a preferred embodiment of the present invention. Prior to executing each model, combining model program 250 accesses the predictive models and checks whether the models are available for the geographical location of the real estate entity to be valued. Program 250 checks whether real estate database 240 contains data for the geographical location of the real estate entity to be valued. For explanatory purposes, it will be assumed that repeat sales model 510 and the HNC model 520 (see FIG. 5) are available for the real estate entity to be estimated.

The first two stages of combining models are computing the estimate of the real estate entity for each individual model(step 410) and computing the precision variables (step 420). These two stages are repeated for each individual model (steps 411–415 and steps 421–425). For explanatory purposes, Model A is assumed to be repeat sales model 510, the process of which will now be explained.

To verify that model 510 is available for the geographical location of the real estate entity, program 250 accesses repeat sales table 244 shown in FIG. 6. Table 244 and 620 indicate the state and geographic area of the repeat sales data, respectively. Column 630 shows the quarterly period of the corresponding data. For example, the first entry "Q850" specifies the first quarter in 1985. The next column 640 contains pre-calculated growth rates for the specified state, geographic area, and period. Appreciation program 270 computes this growth rate using historical data from real estate database 240. The growth rate for the first row, "1.01" indicates an appreciation of one percent. The third row "0.99," on the other hand, indicates a depreciation of one percent. The last column 650 includes a measure of precision to reflect the precision of the computed growth rate.

Prior to executing repeat sales model 510, combining model program 250 determines whether model 510 is available. To do so, program 250 accesses repeat sales table 244 and verifies that it contains data corresponding to the purchase date of the real estate entity to be valued. If the appropriate data exists, program 250 proceeds to execute the model to compute the estimate. As mentioned above, repeat sales model 250 is assumed to be available in this example.

To obtain the estimate of value for the real estate entity, RSVAL 512 of FIG. 5, repeat sales model 510 accesses repeat sales table 244 for the growth rate of the quarterly period corresponding to the transaction date of the real estate entity and the present date. The estimated value of the real estate entity is then obtained by multiplying the growth rate with the purchase price stored in input table 242

Thereafter, program 250 computes precision variables for repeat sales model 510 (step 420). In the preferred embodiment, program 250 uses standard mathematical techniques to compute measures of precision such as the variance, RSVAR 514, and standard deviation, RSSD 516, of FIG. 5.

The user also has an option to bias correct the estimate based on historical real estate data. Prior to executing teach model, bias correction program 280 accesses real estate database 240 containing historical data and computes the amount of appropriate bias correction. Specifically, bias correction program 280 computes the average error between past estimates of the real estate entities and actual sale prices of the estimated entity. For example, if program 280 determines that repeat sales model 510 produces estimates. that generally tend to be five percent higher than the actual sale price, then the user may invoke the option to bias correct the estimate by five percent. A similar bias correction may be applied to the precision estimates.

If different types of predictive models are combined, program 250 may transform each individual model estimate to facilitate a comparative analysis between the different predictive models. Details on these types of transformations provided in G. S. Maddala, *Econometrics* 314–317 (1977).

HNC model 520 performs a similar process to compute the estimate of the real estate entity. As mentioned above, AREAS program 260, which is described in detail in documentation accompanying AREAS program 260 version 4.6, executes the HNC model. Referring to FIG. 5, AREAS program 260 obtains estimate of value HNCVAL 522, variance HNCVAR 524, and standard deviation HNCSD 526. If applicable, the HNC model estimate is also bias corrected and transformed for consistency.

Once the individual models complete the estimating process, program 250 checks to see if there are multiple model estimates available (step 430). If multiple model 432). If, on the other hand, multiple model estimates are available, program 250 excludes model estimates with low precision (step 440). In the preferred embodiment of the present invention, a low precision is defined by a comparatively larger standard error than those of other individual models. Other determination factors, such as a threshold standard error, can easily be implemented to determine low precision.

If there are more than one estimate from the same type of model, program 250 can select the best estimate among those model estimates (step 450). In doing so, program 250 first determines whether any estimates are from the same type of model. If so, program 250 may select from the same model estimates the best estimate. For example, if two hedonic estimates are available, program 250 may select the better of the two hedonic estimates, e.g., the estimate with greater precision.

Next, program 250 selects a loss function (step 460). Different loss functions may be selected based on the business application and an explicit optimization problem related to the application. In the present example, the loss function is the squared forecast error loss. However, one skilled in the art may easily substitute other loss functions.

Thereafter, program 250 computes the weight for the remaining model estimates based on the selected loss function (step 470). Implicit in step 470 is the use of a squared forecast error loss. However, one skilled in the art may easily substitute other loss functions. In this example, $$k=(L'*\Omega^{-1})/(L'*\Omega^{-1}*L), \text{ where}$$

$\Omega$=variance/covariance matrix of forecast errors

L=n*1 vector of 1's

L'=1*n vector of 1's (i.e., transpose of L)

k=n*1 vector of weights where $k_i$=weight of ith estimate of value

More specifically, referring to FIG. 5, k for combining repeat sales model 510 and HNC model 520 may be computed as:

$$k = \frac{(HNCVAR - W*HNCSD*RSSD)}{(HNCVAR + RSVAR - 2*W*HNCSD*RSSD)},$$

where

W=correlation of the forecast errors of the two models.

Finally, combining model program 250 computes a combined weighted average estimate of value, C. Program 250 first multiplies k by each remaining model estimate to convert the estimates into weighted estimates. In general, program, 250 combines all the weighted estimates to obtain C as follows (step 480):

$$C=k_1f_1+k_2f_2+ \ldots +k_nf_n, \text{ where}$$

$k_{1,2,3 \ldots n}$=weight of corresponding model estimate $f_{1,2,3 \ldots n}$=model estimates Referring again to FIG. 5, in the present example combining repeat sales model 510 and HNC model 520, the following formulas may be utilized to compute the combined estimate of value, (C 542), variance (CVAR 544), and standard deviation (CSD 546):

$$C=k*RSVAL+(1-k)HNCVAL$$

$$CVAR=k^2*RSVAR+((1-k)^2)*HNCVAR+2*k*(1-k)*W*RSSD*HNCSD$$

$$CSD=CVAR^{(0.5)}$$

Program 250 completes successfully upon obtaining the combined weighted estimate C (step 490).

CONCLUSION

The present invention increases the accuracy of estimates of value for real estate entities by combining the results of each constituent model in an appropriate manner. Additionally, it also enables a timely and reliable estimate that is free of human biases and inconsistency inherent in manual appraisals.

It will be apparent to those skilled in the art that various modifications and variations can be made in the computer network of the present invention and in construction of this computer network without departing from the scope or spirit of the invention.

Other embodiments of the invention will be apparent to those skilled in the art from consideration of the specification and practice of the invention disclosed herein. It is intended that the specification and examples be considered as exemplary only, with the true scope and spirit of the invention indicated by the following claims.

What is claimed is:

1. A method of estimating the value of a real estate entity comprising the steps, performed by a data processor, of:
   accessing real estate data and a plurality of predictive models;
   forming a plurality of estimates for the value of the real estate entity based on the predictive models;
   selecting a plurality of best estimates according to a predetermined criteria;
   converting the best estimates into weighted estimates according to the predetermined criteria; and
   allocating the weighted estimates in a combination to obtain a final valuation of the real estate entity.

2. The method of claim 1 including the steps of
   storing historical data corresponding to the plurality of predictive models, and
   bias correcting each estimate using the corresponding historical data.

3. The method of claim 2 wherein the predetermined criteria includes a precision measure.

4. The method of claim 3 wherein the precision measure includes a standard error.

5. The method of claim 1 wherein the selecting step includes the substeps of
   computing the precision of each estimate, and
   excluding estimates having an inadequate precision according to a predetermined criteria.

6. The method of claim 5 wherein the predetermined criteria is a threshold level of precision.

7. The method of claim 5 wherein the converting step includes the substeps of
   computing a weight for each estimate according to the corresponding level of precision, and
   adjusting each estimate with the corresponding weight.

8. The method of claim 1 including the step of
   storing a loss function corresponding to a business application.

9. The method of claim 7 wherein the computing step further includes the substep of
   using the loss function to compute the weight.

10. The method of claim 1 further including the step of
    converting the estimates of the plurality of predictive models into a different format for comparisons.

11. A system for estimating the value of a real estate entity comprising:
    a first database containing real estate data and a plurality of predictive models;
    means for forming a plurality of estimates for the value of the real estate entity based on the predictive models;
    means for selecting a plurality of best estimates according to a predetermined criteria;
    means for converting the best estimates into weighted estimates according to the predetermined criteria; and
    means for allocating the weighted estimates in a combination to obtain a final valuation of the real estate entity.

12. The system of claim 11 including
    a second database storing in the database historical data corresponding to the plurality of predictive models, and means for bias correcting each estimate using the corresponding historical data.

13. The system of claim 11 wherein the predetermined criteria includes a precision measure.

14. The system of claim 13 wherein the precision measure includes a standard error.

15. The system of claim 10 wherein the selecting means includes means for computing the precision for each estimate, and means for excluding estimates having an inadequate precision according to a predetermined criteria.

16. The system of claim 15 wherein the predetermined criteria is a threshold level of precision.

17. The system of claim 16 wherein the converting means includes means for computing a weight for each estimate according to the corresponding level of precision, and means for adjusting each estimate with the corresponding weight.

18. The system of claim 11 wherein the first database contains a loss function corresponding to a business application.

19. The system of claim 18 wherein the computing means further includes means for using the loss function to compute the weight.

20. The system of claim 11 further includes means for converting the estimates of the plurality of predictive models into a different format for comparison.

21. The method of claim 1, further including displaying the final valuation of the real estate entity in a combined model estimate table to a financial institution personnel.

22. The system of claim 11, further including a display for displaying the final valuation of the real estate entity in a combined model estimate table to a financial institution personnel.

* * * * *

UNITED STATES PATENT AND TRADEMARK OFFICE
CERTIFICATE OF CORRECTION

PATENT NO. : 6,609,109 B1
DATED : August 19, 2003
INVENTOR(S) : Michael G. Bradley et al.

It is certified that error appears in the above-identified patent and that said Letters Patent is hereby corrected as shown below:

Column 6,
Lines 18-19, "allocating the weighted estimates in a combination to obtain a final valuation of the real estate entity." should read -- combining the weighted estimates into a final estimate for the value of the real estate entity. --.
Lines 62-64, "means for allocating the weighted estimates in a combination to obtain a final valuation of the real estate entity." should read -- means for combining the weighted estimates into a final estimate for the value of the real estate entity. --.

Column 8,
Lines 11-14, delete the claim in its entirety.
Lines 15-18, delete the claim in its entirety.

Signed and Sealed this

Twenty-third Day of December, 2003

JAMES E. ROGAN
*Director of the United States Patent and Trademark Office*